Jan. 2, 1923.
E. J. HILEMAN.
AIR PUMP.
FILED MAY 19, 1921.
1,440,680
2 SHEETS-SHEET 1
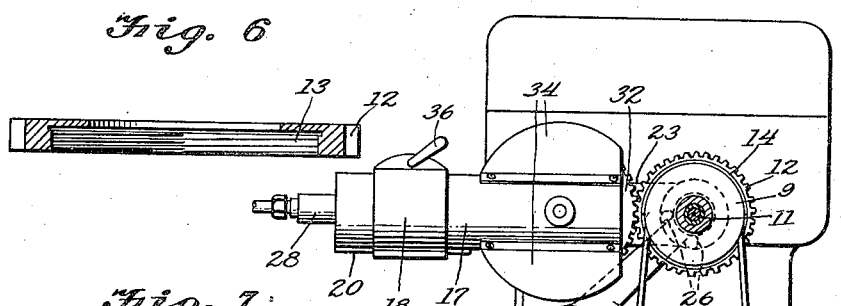
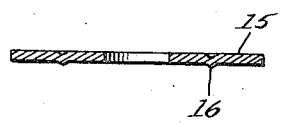
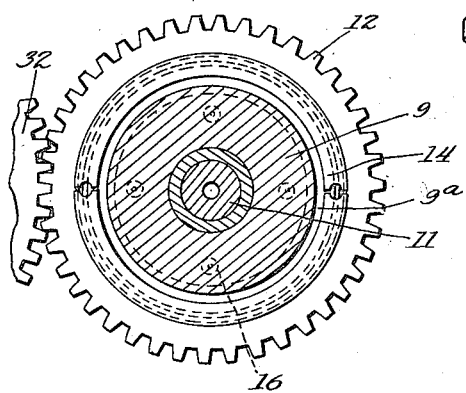
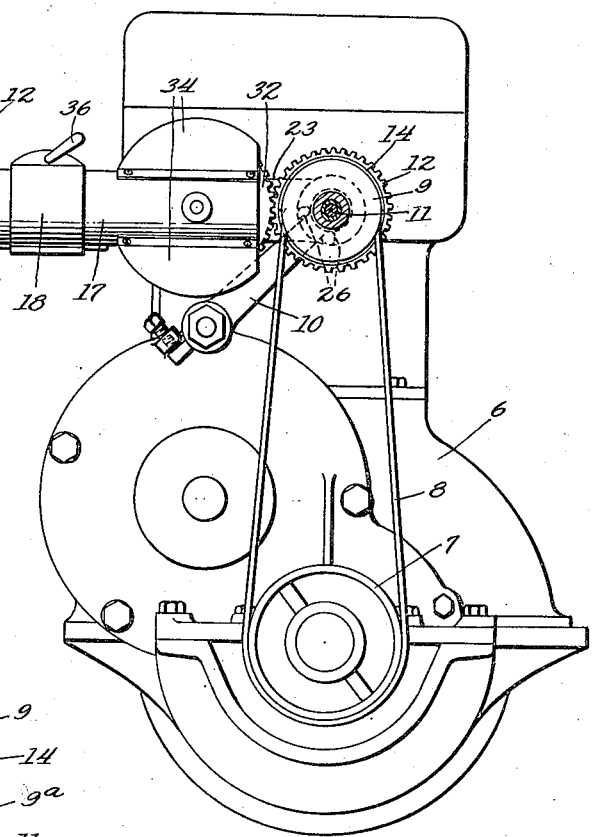
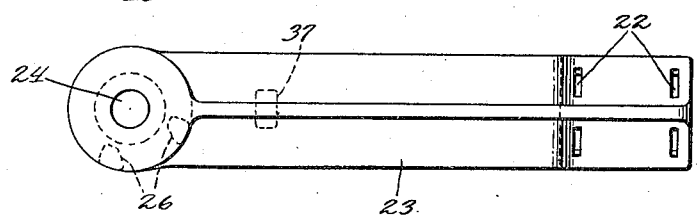
INVENTOR
E. J. Hileman
BY John A. Bommhardt
ATT'Y Jan. 2, 1923.

E. J. HILEMAN.
AIR PUMP.
FILED MAY 19, 1921.

1,440,680

2 SHEETS-SHEET 2

INVENTOR
E. J. Hileman
BY John A. Bommhardt
ATT'Y

Patented Jan. 2, 1923.

1,440,680

UNITED STATES PATENT OFFICE.

ERNEST J. HILEMAN, OF CLEVELAND, OHIO, ASSIGNOR, BY DIRECT AND MESNE ASSIGNMENTS, OF SEVEN-FIFTEENTHS TO WILLIAM C. SCHAEFER, OF CLEVELAND, OHIO, AND ONE-FIFTEENTH TO LOUIS LIPANYE, OF CLEVELAND, OHIO.

AIR PUMP.

Application filed May 19, 1921. Serial No. 470,835.

*To all whom it may concern:*

Be it known that I, ERNEST J. HILEMAN, a citizen of the United States, residing at Cleveland, in the county of Cuyahoga and State of Ohio, have invented certain new and useful Improvements in Air Pumps, of which the following is a specification.

This invention relates to air pumps, and particularly to devices by means of which an air pump may be conveniently mounted on and connected with an automobile engine in such position that the pump may be driven when desired, by a gear connection to the fan shaft, the pump being enabled to be put into or out of use as desired.

The device further includes improved means for supporting a pump on the fan shaft bracket of the ordinary automobile engine, in position for adjustment to accomplish the objects above referred to.

Figure 2:
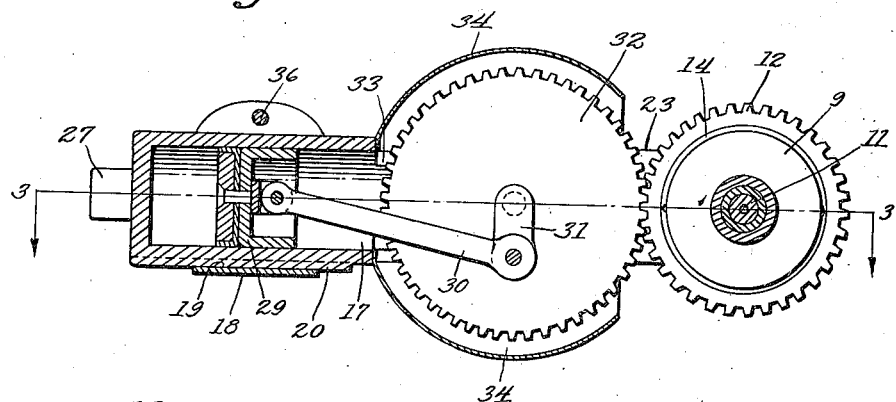
Figure 3:
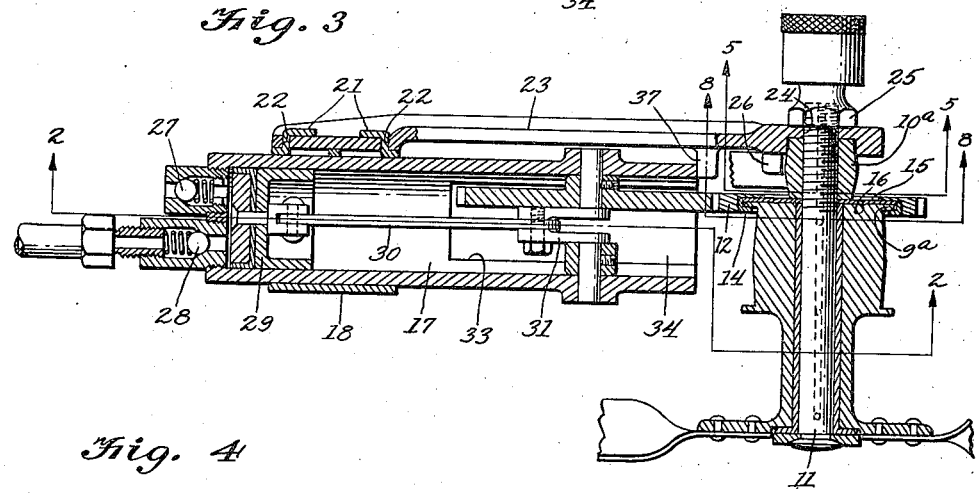
Figure 4:
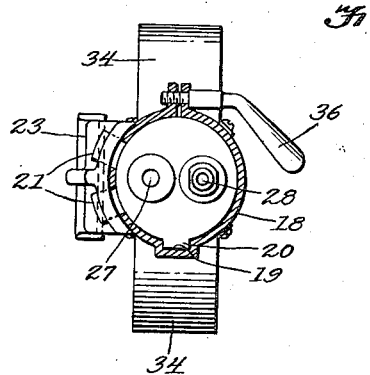
Figure 5:
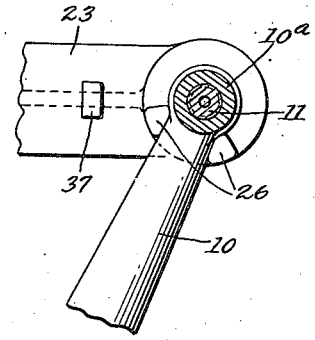

Various other improvements in the details of the device will be apparent from the following description and the accompanying drawings in which Fig. 1 is a front elevation of an engine with the pump applied thereto. Fig. 2 is a section on the line 2—2 of Fig. 3. Fig. 3 is a section on the line 3—3 of Fig. 2. Fig. 4 is an end view of the pump, partly in section. Fig. 5 is a section on the line 5—5 of Fig. 3. Fig. 6 is a section of a gear which is mounted on the fan pulley. Fig. 7 is a section of a washer associated with the said gear. Fig. 8 is a section on the line 8—8 of Fig. 3. Fig. 9 is a side view of supporting arm for the pump.

Referring specifically to the drawings, 6 indicates an engine which may be of any suitable or ordinary type, having a pulley 7 which drives a belt 8 which drives the fan shaft pulley 9. These parts may be of any ordinary or accepted construction and the details thereof are immaterial. The fan and its pulley is supported by a bracket 10 fixed to the engine casing, this bracket having an eye 10$^a$ for the supporting pin 11 of the fan shaft.

The fan pulley has a small flange 9$^a$ at its rear end, and this flange is utilized for supporting one of the gears 12 which drive the pump. This ring gear is slipped over the pin of the fan shaft and has on one side a threaded recess 13 which receives the end of the fan pulley 9, the rim of the gear projecting over the flange 9$^a$ on the fan pulley. The gear is fastened to the pulley by a split screw ring 14 which is assembled and screwed into the threaded recess 13 in the gear 12, the ring 14 binding against the inner side of the flange 9$^a$, and to prevent slip, a washer 15 is inserted between the gear 12 and the end of the fan pulley 9, said washer having points 16 which under the screw pressure are forced into the end of the fan pulley and so lock the gear to the pulley.

The pump comprises a barrel 17 which is held by a split clamping band 18 fitting around the same, the band having a groove at 19 which receives a rib 20 on the under side of the cylinder so that the cylinder is correctly lined with respect to the gears. The band 18 has tongues 21 struck up therefrom and fitting through slots 22 in a main supporting arm 23, the tongues being swaged down as shown in Fig. 3 to hold the band 18 to the arm. The other end of this arm has a recessed eye at 24 which fits over the eye 10$^a$ of the supporting bracket, as shown in Fig. 3, and is clamped by the oil cup stud 25 screwed on to the end of the fan pin 11, and the arm 23 also has a pair of lugs 26 engaging opposite sides of the bracket 10 so that the arm is supported in fixed position with respect to the bracket (see Fig. 5).

The pump barrel has the usual inlet valve 27 and outlet valve 28, and a piston 29 connected by a rod 30 to a crank 31 the shaft of which is mounted in bearings in the end of the cylinder and carries a gear 32 which when the pump is in operation meshes with the gear 12 on the fan pulley. The end of the cylinder has long slots at 33 to give room for the crank and gear 32, and these slots are covered by casings 34 secured to the pump barrel. The clamp 18 is provided with a clamping screw handle 36, and the arm 23 has a lug 37 which acts as a stop to limit the inward adjustment of the pump and barrel when the gears are set into mesh.

In use, by loosening the screw handle 36 and the clamp 18 the cylinder barrel may be pushed inwardly against the stop 37, at which time the gear 32 will mesh with the gear 12 on the fan pulley, and said pulley being driven in the usual manner the pump piston will be reciprocated with the usual results. When the pump is not in use, the pump barrel is slipped outwardly in the clamp 18 until the gears are disengaged, the pump remaining idle until the next occasion for its use. The clamp 18 will be tightened of course to hold the pump in its inoperative position when not in use.

The device forms a simple and convenient air pump attachment for ordinary gasoline automobile engines, and may be attached to almost any of the standard motors. The invention is of course not limited to the exact devices shown in the drawings, as slight modifications may be required to suit local conditions, or may otherwise be made within the scope of the following claims.

A feature of the invention is the ease with which the attachment may be applied to existing motors, without the use of special parts or appliances on the latter.

I claim:

1. The combination with a fan shaft bracket and a fan pulley supported thereby, of an arm secured to the bracket by the same means as those supporting the pulley, a clamp on the outer end of the arm, a pump cylinder slidable lengthwise in said clamp, a piston in the cylinder, a crank shaft in the cylinder, connected to the pump piston, a gear on the crank shaft, and another gear adapted to mesh therewith and fixed to the fan pulley.

2. The combination of a fan shaft bracket and a pulley and its spindle supported thereon, of an arm fixed to the bracket by said spindle, a clamp carried by the arm and having a guide, a pump cylinder slidable lengthwise in said clamp and having a projection engaging said guide, and means driven by the fan pulley for operating the pump.

3. The combination of a fan shaft bracket and a pulley supported thereon, of an arm fixed to the bracket, a clamp carried by the arm and having a guide, a pump cylinder slidable lengthwise in said clamp and having a projection engaging said guide, and means driven by the fan pulley for operating the pump, said means including a crank shaft mounted on the pump cylinder, and a gear on said shaft, and another gear secured directly to the said pulley.

In testimony whereof, I do affix my signature in presence of two witnesses.

ERNEST J. HILEMAN.

Witnesses:
  JOHN A. BOMMHARDT,
  BESSIE F. POLLAK.